Nov. 4, 1958

E. C. STARK 2,858,637

FISHING ACCESSORIES

Filed March 1, 1956

INVENTOR.
ELMER C. STARK

BY George B. White

ATTORNEY.

United States Patent Office 2,858,637
Patented Nov. 4, 1958

2,858,637

FISHING ACCESSORIES

Elmer C. Stark, Vallejo, Calif.

Application March 1, 1956, Serial No. 568,922

1 Claim. (Cl. 43—43.12)

This invention relates to improvements in fishing accessories and has particular reference to means for retaining the original sinker on a lowered line to thus eliminate the cost of utilizing a number of sinkers during trolling operations in fishing for salmon, bass and like game fish.

The principal object of the invention is to employ a line that carries the sinker, and a hand or pole carrying line to which the bait bearing hook is secured, and the utilization between the lines of means for detachably connecting the two lines, whereby the hooked fish can be easily and conveniently played, independent of the sinker to thus eliminate the weight of the sinker in pulling the caught fish to the surface of the water.

A further object of the invention is the use of means in the form of a tubular member equipped at one end with a sinker retaining element and at its opposite end with a trigger mechanism whereby the hook and bait carrying line can be readily freed from the tubular member to more readily attach or hook the illusive game fish.

Other objects and advantages will be apparent during the course of the following description.

I am aware that some changes may be made in the general arrangements and combinations of the several devices and parts, as well as in the details of the construction thereof without departing from the scope of the present invention as set forth in the following specification, and as defined in the following claim; hence I do not limit my invention to the exact arrangements and combinations of the said device and parts as described in the said specification, nor do I confine myself to the exact details of the construction of the said parts as illustrated in the accompanying drawings.

With the foregoing and other objects in view which will be made manifest in the following detailed description, reference is had to the accompanying drawings for the illustrative embodiment of the invention, wherein:

In the accompanying drawings forming a part of these specifications, wherein for the purpose of illustration, like numerals designate like parts throughout the same, Fig. 1 is a view partly in section and partly in elevation of the tubular member of the invention that is interposed between the sinker line and the fishing line.

Figure 1:
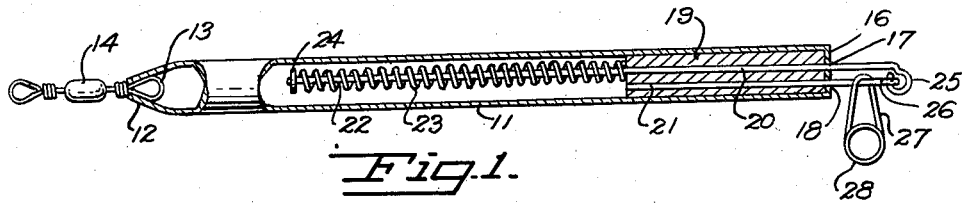

Referring in detail to the drawing and numerals thereof, wherein for the purpose of illustration like numerals designate like parts throughout the same, the numeral 5 designates a portion of a boat while the numeral 6 designates a fishing pole to which is secured a fish line 7 equipped with a conventional hook 8 to which the bait is secured. The numeral 9 designates a second line that is suspended from the boat and to which a sinker of conventional type is secured.

Figure 3:
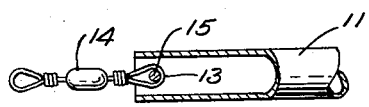
Fig. 3 is a fragmentary detail view of a slightly modified form of the sinker retaining means.
Figure 2:
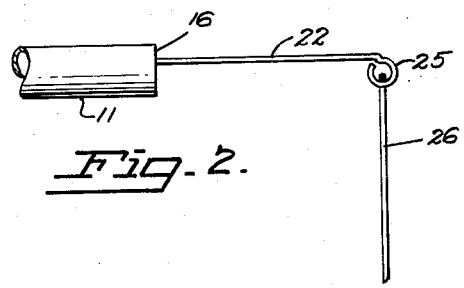
Fig. 2 is a fragmentary detail view of the portion of the trigger mechanism.

Referring to Fig. 1 of the drawing the numeral 11 designates an elongated tubular member that is crimped at one end as at 12 (see Fig. 1), and is adapted to retain therein a loop 13 of a swivel sinker connecting means 14. Instead of crimping the end 12, a cross pin 15 can readily be employed to retain the loop 13 (see Fig. 3 of the drawing).

The numeral 16 designates a cap or top for the tubular member that is provided on the end opposite said swivel member. The said cap is provided with a central opening 17 and an offset opening 18, the purpose of which will be hereinafter described. It will be noted that a cylindrical filler 19 is suitably secured in the said opposite end of the tubular member and is provided with a central aperture 20 and an offset aperture 21, respectively, in communication with the two openings in said cap.

As disclosed to advantage in Fig. 1 of the drawing the numeral 22 designates an elongated rod that is encircled by a coil spring 23. A disc or collar 24 is secured to the free end of said rod and cooperates with the inner flat end of the filler to retain the spring in an operative position when it is fully expanded. The central opening of the filler is adapted to receive for reciprocatory movement therein the rod 22, which rod terminates in a loop 25 that has pivotally connected thereto a short rod 26 that serves as a part of the trigger element of the invention, which short rod normally rests in the offset aperture 21. Slideably mounted on the short rod is a depending loop 27 that has integrally formed therewith a ring 28 through which is placed the fishing line 7. To the end of the line the bait carrying hook 8 is suitably connected.

In operation, after the hook has been baited, the sinker line and the fishing line are lowered in the water. When a fish strikes, the pulling action of the fish will cause the disengagement of the short rod from its normal seated position in the offset aperture.

Figure 4:
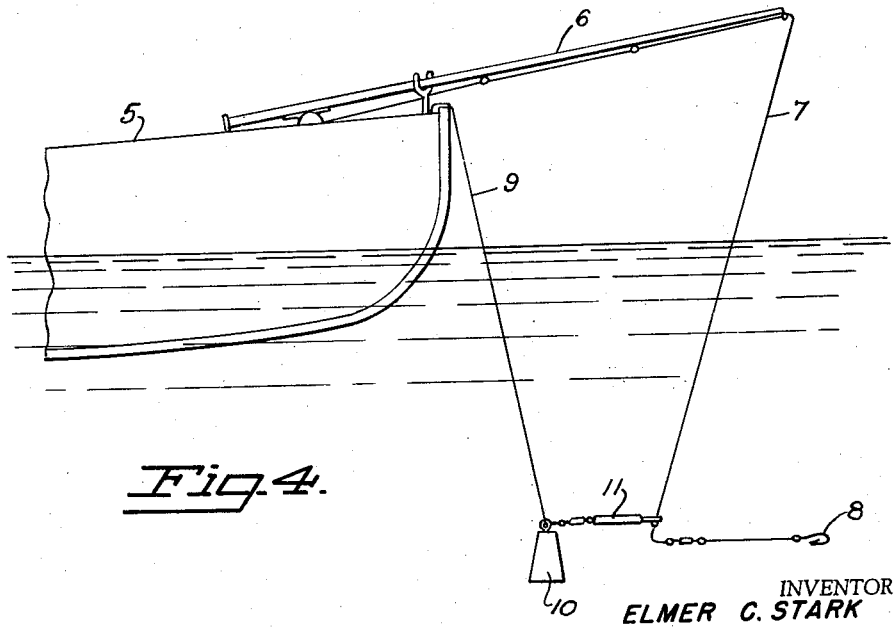
Fig. 4 is a side elevational view of a portion of the boat disclosing the relationship of the bait holding line and the sinker line and the tubular member for connecting the respective lines.

The loop element 27 will then be free to pass over the free end of the short rod 26 which element frees the line so that the fish can be conveniently played independently of the excess weight of the sinker and the tubular member. These latter elements can be conveniently retrieved after the fish has been landed. The invention can then again be set up and connected for use, as disclosed in Fig. 4 of the drawing, with the trigger in place for operative use when a fish again strikes.

It is to be understood that the forms of my invention herewith shown and described are to be taken as the preferred examples of the same and that various changes relative to the shape, size, material and arrangement of parts may be resorted to without departing from the spirit of the invention or the scope of the subjoined claim.

I claim:

In a fishing device, the combination with a fish line with a hook thereon; of an auxiliary sinker supporting line adapted to be suspended separately from said fish line, a sinker on said sinker line, a connecting device between the sinker line and the fish line near the sinker, said connecting device including a tubular element, loop means in one end of the tubular element engageable with said sinker line, a first rod extended from the other end of said tubular element, resiliently yieldable means to hold said first rod in retracted position in said tubular element, a loop holder rod pivoted on the outer end of said first rod, the free end of said loop holder rod being held in the adjacent end of said tubular member and being of such length that the free end thereof is withdrawn and released from the end of said tubular element when said first rod is pulled outwardly from said tubular element, and a guide loop adapted to slidably surround said fish line and to hang on said loop holder rod to be released therefrom when said releasing element is withdrawn from the tube by the pull exerted upon the hook on the fish line.

References Cited in the file of this patent

UNITED STATES PATENTS

| | | |
|---|---|---|
| 2,121,279 | Beck | June 21, 1938 |
| 2,627,692 | Goodman | Feb. 10, 1953 |
| 2,733,537 | Elsberg | Feb. 7, 1956 |
| 2,735,212 | Baum | Feb. 21, 1956 |